3,586,517
EXTRUDER DIE
Robert W. La Warre, Lima, Ohio, and Robert H. Bundus, Riverside, Ill., assignors to Beatrice Foods Co., Chicago, Ill.
Filed Apr. 1, 1969, Ser. No. 811,837
Int. Cl. B30b 11/22
U.S. Cl. 99—238    5 Claims

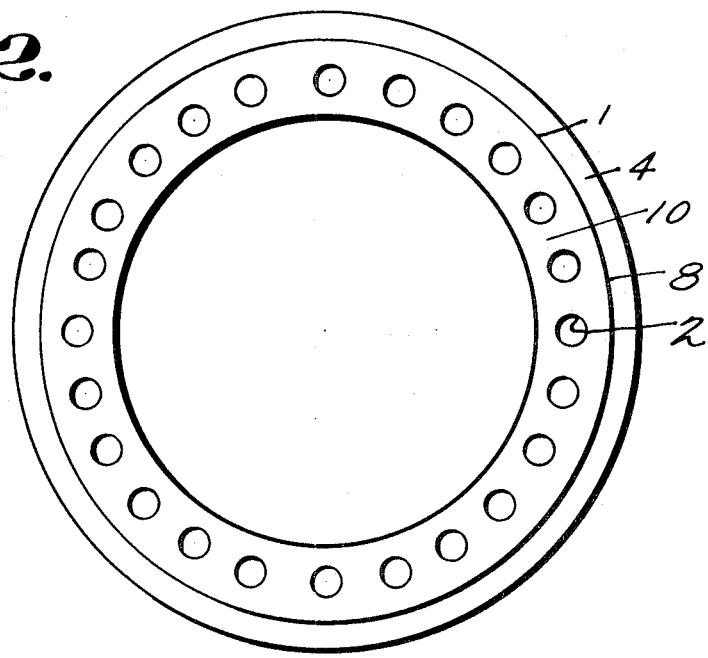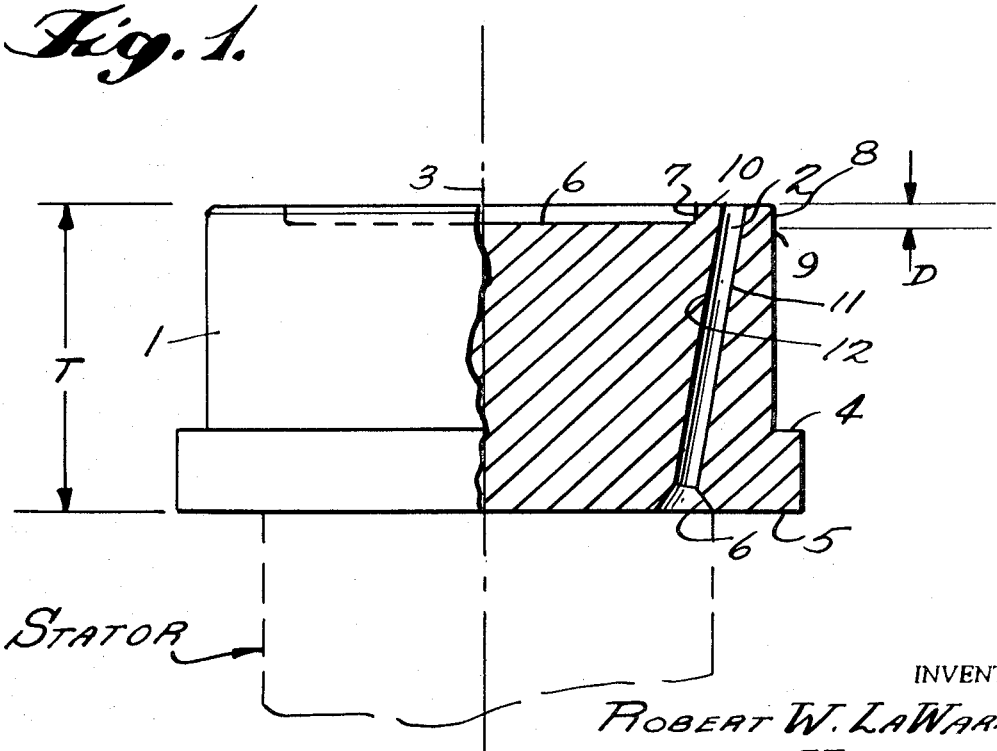

ABSTRACT OF THE DISCLOSURE

There is provided a die plate, especially for extruding cereal meals, which has a plurality of outwardly inclined bores therethrough, with respect to the center line of the die plate. A recessed face is circumscribed by the discharge of the bores and receives a blast of cooling air. The extrudant is uniformly shaped and not burned.

---

The present invention relates to an improved die plate for extruding food materials.

Heretofore, die plates for extruding food materials have taken the configurations and designs normally associated with die plates for extruding other non-food material, e.g. plastics. While these conventional die plates work well for most food applications, the event of snack foods and the like have placed demands on the conventional die plates which cannot be readily obtained. Especially, extruded cereal meals for producing flavored shapes and expanded flavored shapes do not function well in these conventional die plates and allowed only inefficient and relatively low production rates. Especially troublesome is the propensity of conventional die plates to burn such cereal meals and produce a darkened unsightly product with a burned flavor which is difficult to mask.

Accordingly, an object of the present invention was to provide a die plate which will allow a greater production rate of uniformly formed food products. Another object was to provide a die plate which will allow the product of food materials, especially cereal meal products, which are not burned during the shaping in a die plate. Other objects will be apparent from the following disclosure and claims.

Briefly stated, the present invention provides a die plate wherein a plurality of bores traverse through the die plate at a slight outward angle from the center line of the die plate and within the area enclosed by the discharge of the bores in the die plate a recessed face is provided for receiving a flow of cooling air.

The invention will be further illustrated by the drawings where:

FIG. 1 is an elevation, partly in cross section; and
FIG. 2 is a plan view of FIG. 1.

As can be seen from the figures, there is provided a die plate 1 having a plurality of bores traversing through the die plate, one of which bores is shown at 2. The bores 2 are at an outwardly inclined angle from center line 3 of die plate 1. Die plate 1 also has a conventional clamp ring for clamping the die plate to an extruder discharge and a conventional seal face 5 for mating with an extruder in a conventional manner. A counter bored entrance 6 is provided on the extruder side of bores 2 for a smooth transition of the extruded mass from the extruder barrel to the die plate bores. A recessed face 6 lies within the area of the die plate circumscribed by the plurality of bores 2, which recessed face terminates just short of the discharge of the bores at point 7. Also the discharge of the bores are so positioned that there is a bore land 8 between the discharge of the bore and the outer extremity 9 of the die plate. The bore land 8 may be rounded as shown in FIG. 1. As can also be seen from FIG. 1, this arrangement also provides a recess land 10 between the inner extremity of the bores and the outer extremity of the recess, i.e. between point 7 and the discharge of bores 2. The bores 2 are positioned so that the angle between the center line of the die plate and the center line of the bores is between about 4° and 25°, especially between about 5° and 20°, e.g. 8° and 15°. The depth of the recessed face 6 (indicated by D) from the faces of the lands 8 and 10 may be varied as will be further explained below in connection with the theory of operation but will often be between 0.1 inch and 0.4 inch in depth. Similarly, the thickness T of the die plate may vary but is often between 1¾ inches to 2½ inches. The width of the extruder plate is not critical and may be chosen as desired to match the barrel of any particular extruder used.

While not being bound by theory, it is believed that the superior results of the present die plate reside in the above described relationships and configurations coacting to provide an advantageous temperature profile throughout the die plate which temperature profile allows an increased throughput of uniformly shaped extrudant and yet is so adjusted that burning of the extrudant is avoided. In this regard, a consideration of FIG. 1 will facilitate an understanding of this success. As can be appreciated, the extrudant must be maintained above its freezing point and below its burning temperature. Also, as the extrudant passes through bores 2, the temperatures about the circumference of the bore should be substantially the same. For example, if the area of the bore adjacent the center part of the die plate is too hot, burning may occur on the extrudant in contact therewith, while the area of the bore adjacent the outer extremity of the die plate may be too cool and a non-uniformity of the shape of the product may result. Accordingly, by positioning the bores at an angle from the center line of the die plate the bores continually approach the outer extremity of the die plate and the area of the bores adjacent thereto have a greater opportunity to cool due to the decreasing thickness of the die plate material between the bores and the outer extremity of the die plate, as the bores traverse the die plate from the entrance end to the exit end thereof. To balance the cooling effected by angling the bores, the recessed face receives an air blast which causes cooling of the recessed face and the material of the die plate under the area of the recessed face. The degree of cooling with the die plate under the area of the recessed face will decrease in a radial pattern, the radii thereof extending from the center of the air blast. Hence, if the air blast is directed to approximately the center line of the die plate, the radii of cooling will be generated from the center line of the die plate.

To accomplish this balance of cooling, the area of the recesesd face should be great enough to effect sufficient cooling in the adjacent bores and material of the plate under the recessed face. Generally the area of the recessed face should be at least equal to the area of the die plate which is not recessed, e.g. a ratio of 1 to 1 to 2 to 1 or greater (recessed area/non-recessed area of die plate). Of course, the entrance of the bores should be positioned in the die plate so that the entrance of the bores are approximately at the periphery of the screw of the extruder where maximum pressure exists.

From the above, it is apparent that there is a relationship between the angle of the bores, the thickness of the die plate, the depth of the recessed face, the length of the lands and the temperature of the surface of the recessed face. The temperature on the surface of the recessed face is essentially set by the particular extrudant being used, e.g. for cereal meals 325° F. to 425° F., especially 375° F. to 380° F. Of course, an air blast means, e.g. a compressed air source and directing nozzle, must be provided which will deliver a sufficient amount of cooling air to the recessed face to maintain this temperature on the recessed face. The thickness of the die plate must be great enough to withstand the pressures of the extruder and also provide sufficiently long bores for properly forming the materials, which for most practical purposes will be at least 1 inch thick, e.g. at least 1½ to 1¾ inches thick. Of course, an excessively thick die plate is unnecessary and thickness up to 3½ inches, e.g. up to about 2½ inches, will normally be used. The ratio of the distance of land 10 to land 8 is not so important but generally the distance of land 10 will not be greater than 3 times the distance of land 8 and generally not less than one-half the distance of land 8. Suitably land 10 will have a distance approximately equal to the distance of land 8. Hence the thickness of the die plate, length of lands and temperature of the surface of the recess can be easily chosen in accordance with the particular extrudant being used and the necessary pressures and temperatures required thereby.

Accordingly, this easy choice of the above resolves the matter of correctly choosing the angle of the bores and the depth of the recess. This can be accomplished empirically by selecting a set recess, e.g. 0.2 inch and adjusting the angle of the bore, e.g. from about 8°, until a uniformly shaped, non-burned extrudant is obtained, or vice versa. Alternately, a set angle of the bores, e.g. 10°, may be chosen and with the die plate at operating temperatures, the temperature of the bore is measured both in the area of the outer extremity of the die plate and the area adjacent the area of the die plate under the recessed face, i.e. at points 11 and 12, respectively. The depth of the recess is then increased until these temperatures are approximately equal. The temperature measuring points should be a distance with the bore from the discharge thereof which is equal to about 1 to 3 times the diameter of the bores.

Nevertheless, for cereal meals, e.g. corn, maize wheat, barley, rice, etc., an angle of between about 5° to 20° is most satisfactory with a recess face depth of between 0.1 to 0.4 inch below the surface of the die plate, i.e. the lands.

As a specific example, for extruding corn meal, a die plate was used having a thickness of 1¾ inches, a diameter of 4 inches (with a 4½ inch clamp ring). The bores has a 10° angle from the center line of the die plate and the lands on each side of the bore were ⅛ inch. The depth of the recessed face was 0.2 inch, the bores were 3/16 inch diameter and the die plate contained 26 bores. An air blast from a compressor with a directing nozzle was directed toward the center line of the die plate and the volume of air of the blast adjusted until the recess face was maintained between 375° F. and 380° F. The die plate was attached to a single screw extruder where the screw had in order a feed section, a grinding section, a pressure section and a high pressure section, the latter pressure being sufficient to liquify the meal, as is known. From the high pressure section the liquified meal was extruded through the die and formed uniform, non-burned, shaped sections of meal.

Hence the present invention provides a die plate well suited for extruding cereal meals without burning and yet uniformly shaped.

What is claimed is:

1. A device for shaping and uniformly forming an extrudant, which extrudant is not burned during passage therethrough comprising a die plate, a plurality of bores traversing through the die plate, the said bores being positioned at an outward angle of from about 4° to 25° from the center line of the die plate, and a recessed face in the die plate, the area of the recessed face being enclosed by the discharge of the said plurality of bores.

2. The device of claim 1 wherein the said angle is from about 5° to 20°.

3. The device of claim 2 wherein the said recessed face is recessed from about 0.1 to 0.4 inch below the surface of the die plate.

4. The device of claim 3 wherein the thickness of the die plate is at least one inch.

5. The device of claim 1 wherein means for directing an air blast on the said recessed face as provided, said means being capable of delivering a sufficient volume of cooling air to maintain the temperature of the recessed face between 325° F. and 425° F.

References Cited

UNITED STATES PATENTS

| | | | |
|---|---|---|---|
| 2,853,027 | 9/1958 | Graves | 99—238(PD) |
| 3,054,677 | 9/1962 | Graham et al. | 99—237(R) |
| 3,190,210 | 6/1965 | McComb et al. | 99—238(R) |
| 3,391,657 | 7/1968 | Reese | 107—14(F) |

FOREIGN PATENTS

| | | | |
|---|---|---|---|
| 378,259 | 7/1964 | Switzerland | 107—14(R) |

WILLIAM T. PRICE, Primary Examiner

U.S. Cl. X.R.

107—14